(12) United States Patent
Caron

(10) Patent No.: US 11,601,483 B2
(45) Date of Patent: Mar. 7, 2023

(54) SYSTEM, METHODS, AND COMPUTER PROGRAM PRODUCTS FOR SELECTING CODEC PARAMETERS

(71) Applicant: Genband US LLC, Plano, TX (US)

(72) Inventor: Francois Caron, Montreal (CA)

(73) Assignee: GENBAND US LLC, Plano, TX (US)

( * ) Notice: Subject to any disclaimer, the term of this patent is extended or adjusted under 35 U.S.C. 154(b) by 74 days.

(21) Appl. No.: 15/896,576

(22) Filed: Feb. 14, 2018

(65) Prior Publication Data

US 2019/0253303 A1 Aug. 15, 2019

(51) Int. Cl.
*H04L 65/80* (2022.01)
*H04L 65/1101* (2022.01)
(Continued)

(52) U.S. Cl.
CPC ...... *H04L 65/1101* (2022.05); *H04L 65/1104* (2022.05); *H04L 65/80* (2013.01);
(Continued)

(58) Field of Classification Search
CPC ............... H04L 65/80; H04L 65/1006; H04L 29/06197; H04L 65/607; H04L 41/042; H04L 43/0876; H04L 47/783; H04L 47/125; H04L 47/70; H04W 88/181; H04W 88/16; H04M 7/0072; G06F 9/5083; G06F 2009/45562; G06F 2009/4557; G06F 9/5088
See application file for complete search history.

(56) References Cited

U.S. PATENT DOCUMENTS

| 7,583,658 B1 * | 9/2009 | Wang ...................... G10L 19/22 |
| | | 370/352 |
| 9,571,552 B2 | 2/2017 | Poulin |
| | | (Continued) |

OTHER PUBLICATIONS

David, VoiceAge Corporation, The new codec for Enhanced Voice Services (EVS), successor of the current mobile HD voice codec AMR-WB, was standardized by the 3rd Generation Partnership Project (3GPP) in Sep. 2014. The EVS codec addresses 3GPP's needs . . . http://www.voiceage.com/EVS (Year: 2015).*

(Continued)

*Primary Examiner* — Kamal B Divecha
*Assistant Examiner* — Alex H. Tran
(74) *Attorney, Agent, or Firm* — Haynes and Boone, LLP

(57) ABSTRACT

Embodiments provide systems, methods, apparatus, and computer program products for selecting codec parameters to satisfy one or more operating constraints. An example method performed by a network component that facilitates a communication session set-up process among endpoints in a communication network, the method includes: during the communication session set-up process, determining a utilization factor of the network component; selecting a value for sampling frequency associated with a first codec in response to determining the utilization factor; negotiating use of the first codec and the value for sampling frequency with a first endpoint and negotiating use of a second codec with a second endpoint; and transcoding a media stream of a communication session between the first endpoint and the second endpoint according to the first codec and the value for sampling frequency and the second codec.

10 Claims, 5 Drawing Sheets

(51) Int. Cl.
*H04L 65/1104* (2022.01)
*H04L 65/1069* (2022.01)
*H04W 88/18* (2009.01)
*H04M 7/00* (2006.01)

(52) U.S. Cl.
CPC ....... *H04L 65/1069* (2013.01); *H04M 7/0072* (2013.01); *H04W 88/181* (2013.01)

(56) References Cited

U.S. PATENT DOCUMENTS

| | | | | |
|---|---|---|---|---|
| 9,876,838 | B2* | 1/2018 | Li | H04L 65/10 |
| 2004/0032485 | A1* | 2/2004 | Stephens, Jr. | H04N 7/152 |
| | | | | 348/E7.084 |
| 2004/0032860 | A1* | 2/2004 | Mundra | H04L 65/80 |
| | | | | 370/352 |
| 2005/0073997 | A1* | 4/2005 | Riley | H04L 65/80 |
| | | | | 370/352 |
| 2006/0256810 | A1* | 11/2006 | Yarlagadda | H04L 51/04 |
| | | | | 370/465 |
| 2008/0123687 | A1 | 5/2008 | Bangalore et al. | |
| 2008/0268903 | A1* | 10/2008 | Tamura | H04M 1/6066 |
| | | | | 455/556.1 |
| 2010/0134336 | A1 | 6/2010 | Sung et al. | |
| 2012/0044931 | A1* | 2/2012 | Harper | H04L 65/1069 |
| | | | | 370/352 |
| 2013/0156119 | A1* | 6/2013 | Poulin | H04L 65/80 |
| | | | | 375/259 |
| 2013/0232273 | A1* | 9/2013 | Lawn | H04L 67/141 |
| | | | | 709/228 |
| 2014/0056296 | A1 | 2/2014 | Madabhushi et al. | |
| 2014/0099966 | A1* | 4/2014 | Hori | H04W 76/22 |
| | | | | 455/450 |
| 2014/0270253 | A1* | 9/2014 | Yuenyongsgool | G06F 1/10 |
| | | | | 381/98 |
| 2014/0280991 | A1* | 9/2014 | Lederman | H04L 67/306 |
| | | | | 709/228 |
| 2015/0071297 | A1* | 3/2015 | Tsoutsaios | H04L 69/24 |
| | | | | 370/401 |
| 2015/0117232 | A1* | 4/2015 | Dunne | H04L 67/535 |
| | | | | 370/252 |
| 2016/0072868 | A1* | 3/2016 | Poulin | H04L 65/103 |
| | | | | 709/219 |
| 2016/0359942 | A1* | 12/2016 | Li | H04L 65/1069 |
| 2017/0006078 | A1* | 1/2017 | Leung | H04N 7/15 |
| 2017/0154635 | A1* | 6/2017 | Doehla | G10L 19/173 |
| 2017/0214790 | A1* | 7/2017 | Sun | H04L 43/12 |
| 2017/0325125 | A1* | 11/2017 | Novo Diaz | H04W 28/06 |
| 2017/0330576 | A1* | 11/2017 | Jung | G10L 19/22 |
| 2018/0324235 | A1* | 11/2018 | Mufti | H04L 65/1006 |
| 2019/0027156 | A1* | 1/2019 | Sung | G10L 19/22 |
| 2019/0109884 | A1* | 4/2019 | Karapantelakis | H04W 88/181 |
| 2019/0141086 | A1* | 5/2019 | Youtz | H04L 1/007 |
| 2019/0348058 | A1* | 11/2019 | Choo | G10L 21/0208 |
| 2020/0045587 | A1* | 2/2020 | Choi | H04L 65/65 |

OTHER PUBLICATIONS

Järvinen, K., Enhanced Voice Services Codec for LTE, 3GPP, https://www.3gpp.org/news-events/1639-evs_news, NPL (Year: 2014).*

Bruhn, S., AB, E., Eksler, V., VoiceAge Corp., Fuchs, G., IIS, F., Gibbs, J., Huawei Tech. Co. Ltd, Codec for Enhanced Voice Services (EVS)—The New 3GPP Codec for Communication, Workshop at the 140th AES Convention 2016, http://www.aes.org/technical/documentDownloads.cfm?docID=548, NPL (Year: 2016).*

VoiceAge, The new codec for Enhanced Voice Services (EVS), successor of the current mobile HD voice codec AMR-WB, was standardized by the 3rd Generation Partnership Project (3GPP) in Sep. 2014. http://www.voiceage.com/EVS.html, NPL, (Jul. 13, 2015) (Year: 2015).*

Järvinen, K., Enhanced Voice Services Codec for LTE, 3GPP, https://www.3gpp.org/news-events/1639-evs_news, NPL (Nov. 8, 2014) (Year: 2014).*

Bruhn, S., AB, E., Eksler, V., VoiceAge Corp., Fuchs, G., IIS, F., Gibbs, J., Huawei Tech. Co. Ltd, Codec for Enhanced Voice Services (EVS)—The New 3GPP Codec for Communication, Workshop at the 140th AES Convention 2016, http://www.aes.org/technical/documentDownloads.cfm?docID=548, NPL (May 15, 2016) (Year: 2016).*

M. Dietz et al., "Overview of the EVS codec architecture," 2015 IEEE International Conference on Acoustics, Speech and Signal Processing (ICASSP), Brisbane, QLD, 2015, pp. 5698-5702. doi: 10.1109/ICASSP.2015.7179063 https://ieeexplore.ieee.org/document/7179063 (Year: 2015).*

V. Eksler, M. Jelínek and R. Salami, "Efficient handling of mode switching and speech transitions in the EVS codec," 2015 IEEE International Conference on Acoustics, Speech and Signal Processing (ICASSP), 2015, pp. 5918-5921, doi: 10.1109/ICASSP.2015.7179107. (Year: 2015).*

International Search Report and Written Opinion issued by the United States Patent and Trademark Office for International Patent Application No. PCT/US2019/018095 dated May 29, 2019; 11 pages.

VoiceAge-Enhanced Voice Services (EVS) codec, Copyright @2014, VoiceAge Corporation, 3 pgs.

3GPP TS 26.441, v14.0,0, 3$^{rd}$ Generation Partnership Project; Technical Specification Group Services and System Aspects; Codec for Enhanced Voice Services (EVS); General Overview (Release 14), Mar. 2017, 12 pgs.

Extended Search Report dated Jun. 7, 2021 for EP Application No. 19753755.8. 7 pages.

* cited by examiner

SYSTEM, METHODS, AND COMPUTER PROGRAM PRODUCTS FOR SELECTING CODEC PARAMETERS

TECHNICAL FIELD

The present description relates, in general, to network communications and, more specifically, to techniques for selecting coder decoder (codec) parameters in response to resource utilization.

BACKGROUND

Internet protocol (IP) networks and other types of networks can be used to carry data for different types of calls. Various types of calls include voice and video communications and conferencing, and streaming services including audio and video streaming. Audio and video data are typically encoded for transmission via these networks by one or more codecs along the way. A codec may include hardware or software used to encode and decode data, such as audio and/or video data in a signal. A media gateway/media gateway controller and/or a session border controller, located along a network path between the two endpoints, may perform different types of services for the transmission of calls, including transcoding and encryption.

The impact on the internal resources available to the network component varies, depending upon the codec(s) used. Depending upon which codecs are used, transcoding or other services may be necessary at the network component. As the volume of media traffic carried by communications networks continues to increase, the need for network components to provide ever greater capability to handle media traffic in a manner that more efficiently uses resources internal to network components increases as well.

For instance, conventional network systems may be designed with a worst-case scenario in mind, purposefully over-built to avoid dropping calls or providing unacceptable quality to customers. In one example, a network carrier may expect a certain number of calls during certain peak times and may estimate an amount of computing resources at the transcoding components to service those calls during peak times. This estimate may lead to building the carrier's infrastructure to support expected peak time loads. There is a need for systems that use transcoding resources more efficiently, especially during peak times.

BRIEF DESCRIPTION OF THE DRAWINGS

The present disclosure is best understood from the following detailed description when read with the accompanying figures.

SUMMARY

Figure 1:
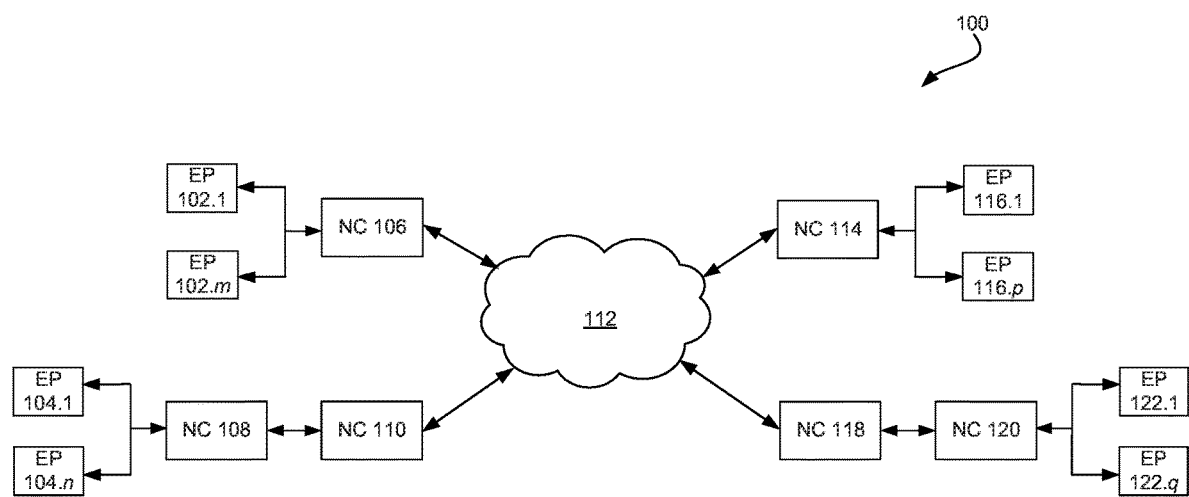
FIG. 1 is an illustration of an exemplary network architecture, according to an embodiment.

According to an embodiment, a method performed by a network component that facilitates a communication session set-up process among endpoints in a communication network, the method includes: during the communication session set-up process, determining a utilization factor of the network component; selecting a value for sampling frequency associated with a first codec in response to determining the utilization factor; negotiating use of the first codec and the value for sampling frequency with a first endpoint and negotiating use of a second codec with a second endpoint; and transcoding a media stream of a communication session between the first endpoint and the second endpoint according to the first codec and the value for sampling frequency and the second codec.

According to another embodiment, a network component includes a transceiver configured to receive a session invite from a first endpoint directed toward a second endpoint, the session invite identifying a first plurality of codecs available at the first endpoint and configured to transmit call set-up information including an identification of a first codec to the first endpoint and an identification of a second codec to the second endpoint; a codec parameter selector configured to select a value for sampling frequency associated with the first codec in response to determining a utilization factor of the network component and configured to negotiate use of the first codec and the value for sampling frequency with the first endpoint and negotiate use of the second codec with the second endpoint; a transcoder configured to transcode a media stream of a communication session between the first endpoint and the second endpoint according to the first codec and the value for sampling frequency and the second codec; and one or more processors configured to execute the codec parameter selector and the transcoder.

According to another embodiment, a computer program product having machine-readable instructions on a non-transitory storage medium of the network component for facilitating a communication session between a first endpoint in a second endpoint in a communication network, the computer program product including: code to determine a utilization factor of a transcoding network component; code to select a value for sampling frequency associated with a first codec in response to determining the utilization factor; code to negotiate use of the first codec and the value for sampling frequency with the first endpoint and negotiate use of a second codec with the second endpoint; and code to transcode a media stream of a communication session between the first endpoint and the second endpoint according to the first codec and the value for sampling frequency and the second codec.

DETAILED DESCRIPTION

The following disclosure provides many different embodiments, or examples, for implementing different features. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments allow for the selection of codec parameters to balance resource usage and media quality at a network component and in response to a currently measured or estimated value for resource utilization of the network component. Thus, such embodiments may allow for a given network component to support more communication sessions at a given time during peak usage times, while maximizing (or at least increasing) media quality during low-usage hours. In some instances, some embodiments may allow a network carrier to avoid over-investing in infrastructure because a given network component may be able to flexibly change its resource usage during peak demand to accommodate more communication sessions.

Communication sessions are used to carry media for different types of calls, such as Voice over Internet Protocol (VoIP) calls, landline calls, and video conferencing and streaming. Communication sessions between different endpoint devices are facilitated by network components. Examples of network components include, e.g., a media resource function processor (MRFP) operating with a media resource function controller (MRFC), a media gateway (MG) in combination with a media gateway controller (MGC), a session border controller (SBC), or the like. Different codecs have different impacts on the various internal resources of a network component tasked with setting up and facilitating communication sessions between endpoints. The same is true for codec parameters, such as bit rate and bandwidth (sampling rate). Various embodiments provide techniques for a network component to efficiently use its internal resources by controlling selection of codec parameters for communication sessions.

One example codec includes Enhanced Voice Services (EVS), currently described in 3GPP Technical Specifications 26.441-26.451. EVS was designed for use with packet-switched media, such as may be employed with Long Term Evolution (LTE). EVS allows for the selection of parameters during call setup, examples of the parameters including bit rate and bandwidth (sampling rate). See TS 26.445. A higher sampling rate provides, of course, more samples per second than would a lower sampling rate. As a general rule, it would be expected that a higher EVS sampling rate would consume more transcoder resources than would a lower sampling rate because of the higher number of samples to be processed. In many embodiments, sampling rate and bit rate are independent of each other. Different bit rates may involve different compression techniques for a given sampling rate, with some lower bit rates being associated with a greater amount of compression for a given number of bits. A greater amount of compression may be expected in some instances to consume more transcoder resources.

In one embodiment, a network component stores a lookup table that has a multitude of entries for a given codec. Each entry includes a value for bandwidth, a value for bit rate, and an entry indicating a resource usage of the pair for a given codec. Or put another way, each entry includes a bit rate and bandwidth pair associated with a resource usage value. Determining a resource usage value may be performed by simulation or testing of the system with the codec.

Continuing with the example, during call setup, the network component may determine a utilization factor of the network component. Utilization factor is discussed in more detail below, but it may generally include one or more numbers to indicate DSP utilization, memory utilization, CPU utilization, and the like, of the network component at that time. In response to determining the utilization factor, the network component parses the lookup table to identify a bit rate and bandwidth pair that satisfies an operating constraint for the utilization factor and also a constraint for media quality.

For instance, if it is determined that the utilization factor indicates a high utilization of resources of the network component, then the network component may choose a bit rate and bandwidth pair that is associated with a lower resource usage value. But since the system may also balance quality with resource usage, the system may not choose the bit rate and bandwidth pair associated with the lowest resource usage value, but may instead choose a bit rate and bandwidth pair that provides better media quality at an acceptable resource usage value. On the other hand, if it is determined that the utilization factor indicates a low utilization of resources of the network component, then the network component may choose a bit rate and bandwidth pair that is associated with a higher resource usage value because media quality may be increased without overusing the resources.

Such example techniques may be performed during call setup as the transcoder negotiates the codecs for use with each of the endpoints. In one example embodiment, the transcoder may choose a particular bit rate and bandwidth pair and send an identification of that bit rate and bandwidth pair to a given endpoint in a message, such as a session initiation protocol (SIP) invite having session description protocol (SDP) information to identify the codec and its parameters.

FIG. 1 is an illustration of exemplary network architecture 100, according to an embodiment. The embodiment of FIG. 1 is one example of a system that may select bit rate and bandwidth pairs to balance quality and resource usage. Architecture 100 includes endpoints 102.1 through 102.$m$, 104.1 through 104.$n$, 116.1 through 116.$p$, and 122.1 through 122.$q$. The various endpoints communicate with each other, or other endpoints not shown, via one or more network components such as network components 106, 108, 110, 114, 118, and 120, and network 112. For example, endpoints 102.1 through 102.$m$ may communicate via network component 106 and network 112 to transmit and receive data, such as voice and/or video calls. Endpoints 102.1 through 102.$m$ may be, for example, analog or digital telephones, a SIP proxy, or IP phones to name just a few examples. In an embodiment, the endpoints 102.1 through 102.$m$ are IP phones, in which situation the network component 106 may be a session border controller. More or fewer endpoints than those shown in FIG. 1 are also possible, as will be recognized by those skilled in the relevant arts.

As a further example, endpoints 104.1 through 104.$n$ may include analog or digital telephones. In this embodiment, the network component 108 may include a publicly switched telephone network (PSTN) or mobile switching center (MSC), and the network component 110 may include a media gateway (MG). A MG may perform various services for a call originating from or routing to any of endpoints 104.1 through 104.$n$, such as transcoding a call for disparate networks or devices. Transcoding may refer to a conversion between different transmission and/or coding types for a call and may include transrating (a bit-rate conversion for a call). The various network components shown in FIG. 1 are all network components with communication capabilities. The network components are not limited to any particular hardware type, but may be implemented in some embodiments using commodity servers running an operating system (e.g., Linux) with SBC, MG, MGC, MRFC, and/or MRFP functionality included as applications running on top of the operating system. Various embodiments may include the SBC, MG, MGC, MRFP and/or MRFC functionality as computer-readable code that is executed by processors of the network components.

A call originating from any of the endpoints 102.1 through 102.$m$ or 104.1 through 104.$n$, after traversing their respective network components, then traverse the network 112. The network 112 may include any kind of network such as a Local Area Network (LAN), a cellular data network (e.g., an LTE network or a 3G network), the Internet, and/or the like, utilizing various types of network protocols, such as IP or asynchronous transfer mode (ATM) to name just a few examples. After traversing the network 112, the call may traverse another network component, such as network component 114, 118, or 120, similar in scope to network components 106, 108, and 110 discussed above, before reaching an endpoint such as one from among endpoints 116.1 through 116.p or 122.1 through 122.q, similar to the endpoints 102.1 through 102.m or 104.1 through 104.n discussed above. Calls originating from any of the endpoints 116.1 through 116.p or 122.1 through 122.q may traverse the various network components and network 112 in similar manner towards any of endpoints 102.1 through 102.m or 104.1 through 104.n.

In an embodiment, a call may originate from endpoint 102.1 directed towards endpoint 116.1. As an example, the call may be made using SIP. When using SIP, an INVITE with a Session Description Protocol (SDP) offer attached to the message from endpoint 102.1 reaches the network component 106. SDP is used for call session initialization, including negotiation of parameters for the call session. Among other things, the INVITE message may include a list of codecs available to the endpoint 102.1. Some examples of available codecs could include audio codecs such as Enhanced Variable Rate Codec (EVRC), Adaptive Multi-Rate (AMR), G.711, Internet Low Bit Rate Codec (iLBC), AMR-WB, G.729, and/or video codecs such as H.261, H.263, H.264, Moving Picture Experts Group (MPEG), or VP8, to name just a few examples of each. In the case of LTE, the available codecs may include EVS. Codecs, such as those listed above, may have different impacts on the network component 106's internal resources, such as one or more of its DSP, bandwidth, hardware accelerator, memory, CPU, etc. Different codec parameters, such as bandwidth and bitrate, may also affect usage of internal resources of network component 106.

The network component 106 may have a list of codecs that are available to the destination endpoint 116.1. In embodiments of the present disclosure, the network component 106 determines the utilization of one or more of its internal resources by measurement or estimation. Based on the utilization determination, the network component 106 may select codec parameters to balance resource usage and call quality should transcoding be used.

The network configuration and topology of architecture 100 shown in FIG. 1 is exemplary only, and may include more or fewer elements than shown in FIG. 1 and still remain within the scope and purpose of embodiments of the present disclosure.

Figure 2:
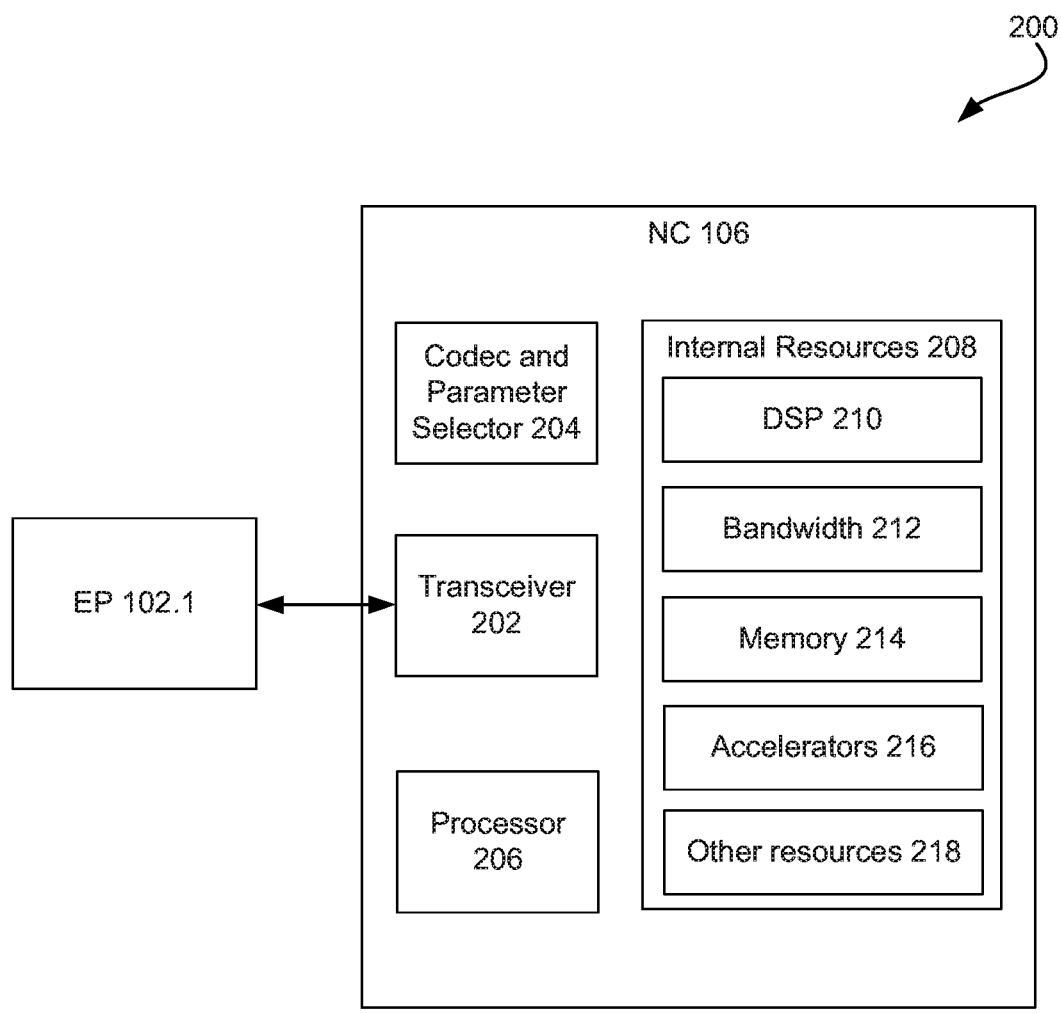
FIG. 2 is an illustration of an exemplary network computer system, according to an embodiment.

FIG. 2 is an illustration of an exemplary network computer system 200, according to an embodiment. For the sake of simplicity of discussion, network component 106 will be used, though it will be recognized that the same will be applicable to any of the other network components 108, 110, 114, 118, and/or 120. Further for simplicity, endpoint 102.1 will be used, though the following discussion is similarly applicable to any or all of the other endpoints.

Endpoint 102.1 sends a call initiation request to network component 106, for example an INVITE when SIP is used. Transceiver 202 of network component 106 may receive the INVITE. Transceiver 202 may include, for example, an Ethernet connection, a WiFi connection, or any other connection that enables the network component 106 to transmit and receive data to and from external sources, such as endpoint 102.1 and network 112. Network component 106 may also include one or more processors 206, which may each include one or more processing cores capable of performing parallel or sequential operations.

Upon receiving the INVITE from the endpoint 102.1, a codec and parameter selector 204 of the network component 106 may act to select a codec and its parameters to balance usage of at least one of the internal resources 208 and media quality in view of a utilization factor. Internal resources 208 may include a DSP 210. DSP 210 may, for example, be used for calls that employ transcoding. With respect to embodiments of the present disclosure, DSP 210 is described as an internal resource because it represents, for example, a finite amount of processing power, e.g. a number of calculations per second, available through the DSP 210's hardware. Internal resources 208 may also include bandwidth 212, for example link bandwidth available (e.g. measured in bits/second). Memory 214 may also be part of internal resources 208, for example a finite amount of RAM storage available to processing elements of the network component 106 to execute program functionality. In an embodiment, memory 214 may store a table having entries corresponding to bit rate and bandwidth pairs. Internal resources 208 may also include accelerators 216, for example one or more hardware accelerators that may be used for encryption and other security measures. The above-noted internal resources 208 are listed by way of example only. As will be recognized, fewer than the above may exist in any particular network component, or more as illustrated by other resources 218, or any sub-combination of the above.

Continuing with the example, processor 206 may determine a utilization factor for its internal resources 208. An example of the utilization factor may include a blended value that takes into account utilization of one or more of the individual resources 210-218. For instance, an example utilization factor may include a weighted average of individual use percentages (e.g., if memory 214 is 49% utilized and DSP 210 is also 51% utilized, the blended value may include a weighted average of those percentages and perhaps percentages for others of the individual resources). Thus, a utilization factor may be expressed as a percentage to reflect an amount of resources that are being used at a given time and an amount of unused resources that may be used for additional communication sessions. Of course, utilization factor may be expressed in any appropriate way, as a weighted average of percentages is just one example.

Continuing with the example, processor 206 may use memory 214 to store a table having entries, wherein each of the entries includes a value for bit rate, a value for bandwidth, a value for resource usage, and a value for media quality. For instance, the table may represent bit rate and bandwidth parameters associated with EVS as they relate to the particular network component 106. An example of a table is shown at Table 1 (below):

TABLE 1

| Bit Rate | Bandwidth | Density | Media Quality |
|---|---|---|---|
| 7.2 kb per second | 8000 samples per second | 990 | 72 |
| ... | ... | ... | ... |
| 24.4 kb per second | 48,000 samples per second | 320 | 99 |

Taking EVS as an example, EVS allows the system to negotiate the amount of bit rate (six different options—7.2 kb per second, 8 kb per second, 9.6 kb per second, 13.2 kb per second, 16.4 kb per second, and 24.4 kb per second).

EVS also allows the system to negotiate the bandwidth or sampling frequency (four different options—narrowband 8000 samples per second, wideband 16,000 samples per second, super wideband 32,000 samples per second, and full band 48,000 samples per second). In this example, sampling frequency is independent of bit rate.

Table 1 (above) shows only two entries, but the ellipses indicate that it is abbreviated. Various embodiments may use any sized table to list any appropriate number of bit rate and bandwidth pairs. For instance, some embodiments may include each available permutation of bit rate and bandwidth, while others may omit some entries. The column for density includes a number that represents resource usage for that particular pair. In this example, density is a concept that indicates how many communication sessions a transcoder may handle, assuming that all of the communication sessions use the same codec parameters. For example, the density value of 990 indicates that the transcoder may handle 990 simultaneous communication sessions, assuming no other traffic, and assuming that each of the communication sessions use 7.2 kb per second and 8000 samples per second to communicate with one of the endpoints. The higher the number for density, the less resource usage a given bit rate and bandwidth pair would be expected to use. Similarly, the lower the number for density, the more resource usage a given bit rate and bandwidth pair would be expected to use. Thus, the entry at the bottom of Table 1 using 48,000 samples per second would be expected to use more resources and thus have a lower density value than the entry at the top using 8000 samples per second.

Of course, the values in Table 1 are for example only, and it is understood that different systems may have different density values for a given bit rate and bandwidth pair. Values for density may be determined before installation of the network component 106 using testing or simulation or some other appropriate technique. Values for density may also be determined after installation of network component 106 through observation and measurement.

The values for media quality may also be determined through testing or simulation or even observation and measurement. The particular values shown in Table 1 are for example only and are based on a score of 0-100, where zero indicates low quality and 100 indicates high quality. Various standards exist for measuring media quality of a codec. Examples include PESQ (ITU-T Rec. P.862 (February 2001)) and POLQA (ITU-T Rec. P.863), both of which provide algorithms to determine media quality. Various embodiments may determine and express media quality in any appropriate manner. Media quality and computational intensity are usually correlated so that a higher computational intensity is generally expected to yield a higher quality. Or put another way, media quality and density may be inversely correlated. A particular bit rate and bandwidth pair determines, at least in part, the amount of internal resources 208 that will be used by component 106 for transcoding, and the pair also determines, at least in part, media quality.

During call set-up, the codec and parameter selector 204 may determine to use EVS (or other codec with settable parameters) according to SDP rules. Assuming use of EVS, the codec and parameter selector 204 may determine a utilization factor (as described above) and then parse the table at memory 214 to select a bit rate and bandwidth pair to satisfy a constraint for resource usage and a constraint for media quality. The constraints for resource usage and for media quality may be set and programmed at component 106 to balance resource usage and media quality for a given value of utilization factor.

Various embodiments may seek to balance resource usage and media quality in any appropriate way. For example, one example may use if-then logic to express the constraints. Continuing with the example, such system may be pre-programmed so that if the utilization factor is 50% or below, then a selected bit rate and bandwidth pair may have a density of any value and a media quality of at least 95. Continuing with such example, the system may also be preprogrammed so that if the utilization factor is between 51% and 75%, then the density should be at least 700 and the media quality may be any value, and if the utilization factor is above 75%, then the density should be at least 900 and the media quality may be any value. Thus, the codec and parameter selector 204 may parse the table in accordance with the utilization factor and select an appropriate bit rate and bandwidth pair, and in the case where multiple bit rate and bandwidth pairs may be allowable, the system may be pre-programmed to select the pair having a higher media quality. Of course, various embodiments may seek to apply bit rate and bandwidth pair in response to resource utilization in different ways, as this is just an example.

Furthermore, utilization factor may change over time as new call sessions are started and other call sessions are ended. Various embodiments include re-negotiating codec parameters in cases wherein utilization factor changes since a particular call was set up. Thus, in a case in which utilization factor has increased past a threshold, various embodiments may renegotiate parameters to lower resource usage. Similarly, in a case in which utilization factor decreases past the threshold, various embodiments may also renegotiate parameters to increase resource usage, thereby increasing media quality as well.

Once the endpoints have acknowledged the codec selections, the endpoints may communicate with each other. In embodiments where each endpoint uses a different codec than the other, for example because of technical limitations at each endpoint, the network component 106 may perform transcoding. In an embodiment, the DSP 210 performs the transcoding between endpoints. Alternatively, the network component 106 may inform and/or manage another network element, such as another network component, in transcoding between endpoints.

Moreover, although the embodiment of FIG. 2 shows a physical implementation of network component 106, other embodiments may employ virtual components. An example of a virtual component may include an application running on a virtual machine, which itself is executed by a server, and wherein that application provides functionality for a SBC, MG, MGC, MRFP and/or a MRFC. However, the scope of embodiments of the principles described herein apply equally well to a virtual network component as to a physical network component.

Figure 3:
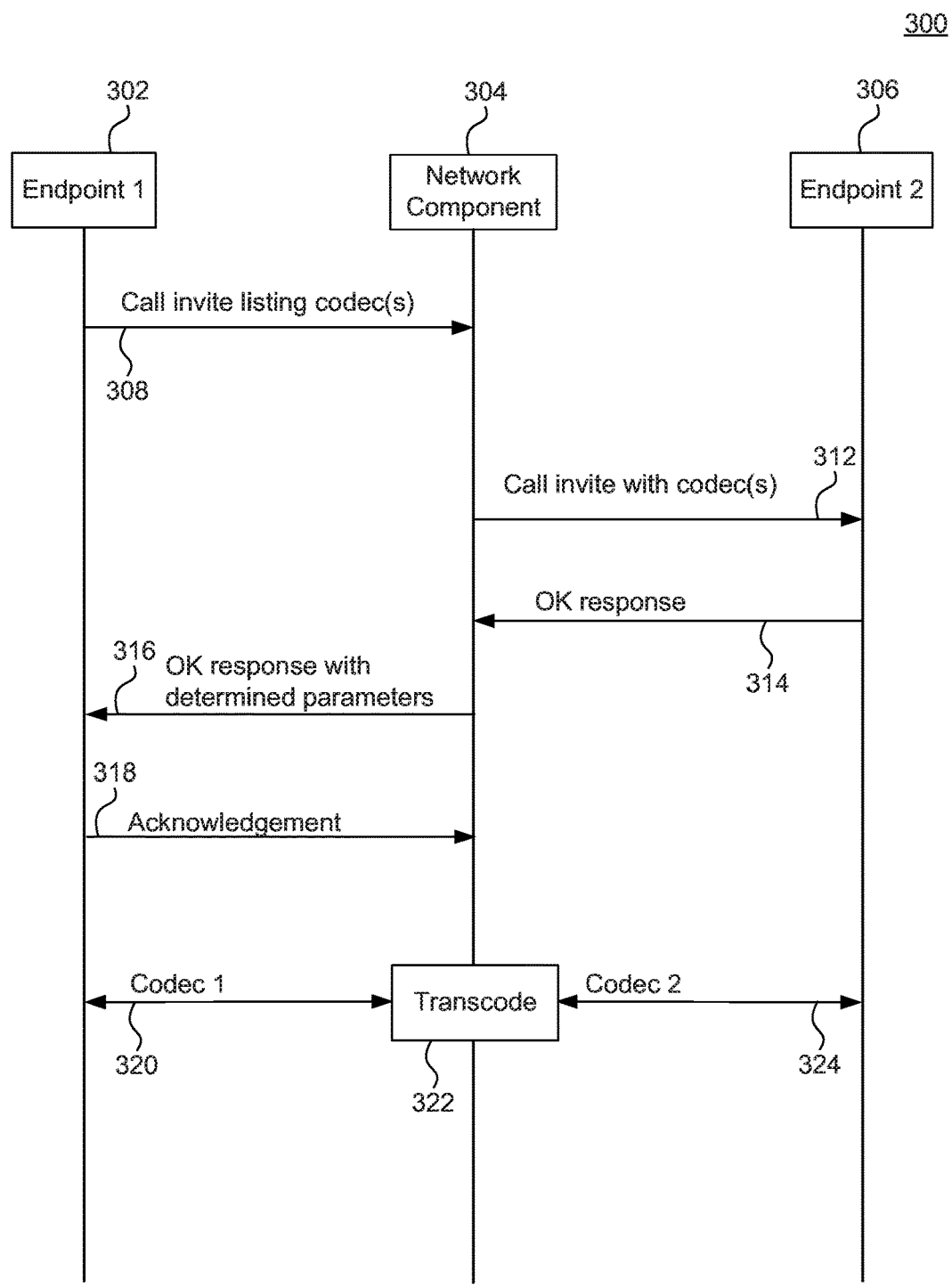
FIG. 3 illustrates an example signal diagram showing an exchange of information between a first endpoint, a network component, and a second endpoint, according to an embodiment.

FIG. 3 illustrates an example signal diagram 300 showing an exchange of information between a first endpoint 302, a network component 304, and a second endpoint 306, according to an embodiment. In FIG. 3, endpoint 302 communicates with endpoint 306 using SIP via the network component 304, although other embodiments using other appropriate protocols and techniques may be used. Endpoint 302 may be an example of endpoint 102.1, network component 304 may be an example of network component 106, and endpoint 306 may be an example of endpoint 116.1, to name just one non-limiting example. Further in this example, endpoint 302 is an LTE device that supports EVS; endpoint 306 does not support EVS.

Endpoint 302 initiates a request for exchange of information by transmitting an INVITE 308 to the network component 304. The invite is intended to initiate a call with endpoint 306 via network component 304. The INVITE 308 may include a variety of information, including a listing of the codec or codecs available at the endpoint 302. As just one example for purposes of illustration, the endpoint 302 may have EVS, EVRC, G.711, and AMR 12.2 as available codecs. In compliance with SIP RFC 3264, the endpoint 302 may offer the available codecs to the network component 304 in order of most to least preferred. In this example, that would mean EVS is most preferred by endpoint 302, followed by EVRC, G.711 and then AMR 12.2. In this example, it is assumed that component 304 also supports and prefers EVS and, thus, selects EVS for use in the communication session.

The network component 304 modifies the INVITE 308 and transmits it as INVITE 312 to the endpoint 306. The modification involves changing the INVITE with the codec listing for endpoint 306 to reflect codecs supported by network component 304. In an embodiment, the network component 304 may include the full prioritized list of codecs in the same INVITE 312.

After the endpoint 306 receives the INVITE 312, the endpoint 306 transmits the 200 OK 314 back to the network component 304, indicating acknowledgement of the selected codec(s) according to SIP. If another protocol other than SIP were used, the endpoint 306 may acknowledge the selected codec(s) according to that protocol.

In an alternative embodiment, the network component 304 may include an indication of each codec in a separate INVITE 312 to the endpoint 306, beginning with the most preferred codec. If the endpoint 306 were to reject the first offered codec, the network component 304 would then send an indication of the next best codec in order of priority to the endpoint 306. This process would repeat until the endpoint 306 provides the 200 OK 314 in response or the call is dropped. As an example, if endpoint 306 is a landline device, then its supported codecs may include, e.g., G.711 or G.729. Assuming that one of those codecs is supported by component 304, the negotiation represented by the messages 312, 314 may include determining to use either G.711 or G.729, depending upon what is supported and preferred by component 304.

After the network component 304 receives the 200 OK 314 from the endpoint 306, the network component 304 transmits the 200 OK message 316 to the endpoint 302. Continuing with the particular example using exemplary Table 1, the network component 304 sets the EVS parameters (in this example, bit rate and bandwidth) to values which take into account current utilization factor. Consistent with the discussion above with respect to FIG. 2, if the network component 304 is already very busy, network component 304 may reply with bit rate and bandwidth values that require less resource usage to satisfy an operating constraint. Note that the values are based on what was originally offered by the endpoint 302; the network component 304 abides by the EVS negotiation rules in this example. Similarly, if the network component 304 is mostly idle, it may reply with bit rate and bandwidth values that maximize the voice quality to satisfy another operating constraint.

The endpoint 302 acknowledges receipt of the 200 OK message 316 with an acknowledgement signal 318 back to network component 304. The endpoints 302 and 306 then set up a call stream and exchange signals 320 and 324, respectively, via the network component 304. Since the network component 304 selected different codecs for each endpoint, the network component 304 transcodes each message between the codecs, for example using DSP 210. Transcoding is represented by action 322. In this particular example, transcoding may include receiving signal 320 from endpoint 302 that has been encoded using EVS, decoding the media of the signal, and re-encoding the media using G.711 to become signal 324, and transmitting it to endpoint 306 (and vice versa). In an alternative embodiment, the network component 304 may inform and/or manage another network component for transcoding.

Figure 4:
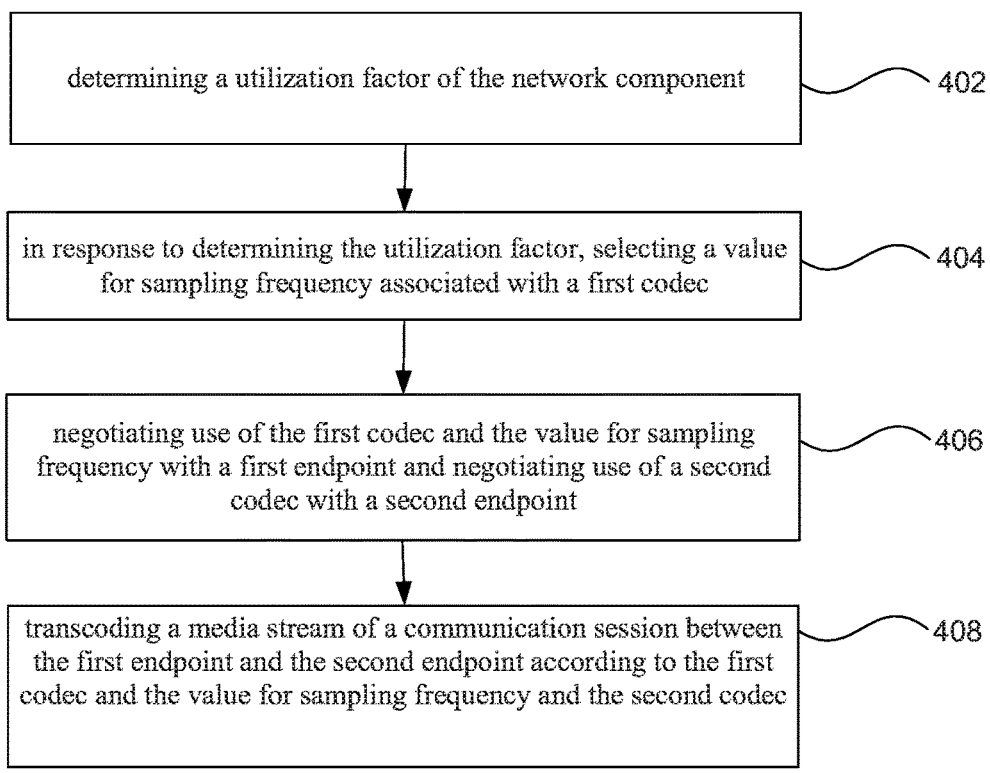
FIG. 4 is a simplified block diagram of an example method, according to an embodiment.

FIG. 4 is a simplified block diagram of an example method 400 for selecting codec parameters in order to balance resource usage and media quality, according to an embodiment. For simplicity, the following discussion will be with respect to endpoints 302 and 306 and network component 304 discussed above with respect to FIG. 3. In an embodiment, method 400 may be performed by network component 304. For example, a computer providing network component functionality may read executable code from a non-transitory medium and then execute the code to perform the actions described below. Furthermore, some embodiments include method 400 being performed by any appropriate transcoding component, such as a SBC, a MG and MGC, a MRFP and MRFC, or a similar network component providing transcoding services.

At action 402, the network component 304 determines a utilization factor of the network component. An example is given above with respect to FIG. 2, wherein the utilization factor is a blended number that may take into account utilization of one or more network component resources and may be expressed as a percent or some other number. In some examples, the utilization factor may indicate an amount of resources that are currently used, capacity of currently unused resources, and/or the like. Utilization factor may represent current utilization and/or may include forecast utilization.

At action 404, the network component 304, for example by way of the codec and parameter selector 204 described in FIG. 2, selects a value for sampling frequency associated with a first codec. In the example described above with respect to FIG. 2, the codec and parameter selector 204 uses the utilization factor to filter preprogrammed bit rate and bandwidth pairs to select an acceptable bit rate and bandwidth pair to satisfy at least one operating constraint.

Thus, in one example, bit rate and bandwidth pairs are stored in a table, wherein each pair is associated with a value for resource usage (e.g., expressed as density) and a value for media quality. In such an example, action 404 may include the codec and parameter selector 204 parsing the table in accordance with the utilization factor and then identifying a particular sampling frequency and bit rate pair to satisfy an operating constraint for either or both of resource usage and media quality.

In one example, the operating constraints may be set out as a group of thresholds, as described above in the example FIG. 2. In that example, if the utilization factor is 50% or below, then a selected bit rate and bandwidth pair may have a density of any value and a media quality of at least 95. Continuing with such example, the system may also be preprogrammed so that if the utilization factor is between 51% and 75%, then the density should be at least 700 and the media quality may be any value, and if the utilization factor is above 75%, then the density should be at least 900 and the media quality may be any value. Of course, those operating constraints are for example only, as other embodiments may use different values. Furthermore, the scope of embodiments is not limited to the particular constraints or use of thresholds in this example. Rather, various embodiments may use any appropriate algorithm to choose a bit rate and bandwidth pair in light of the utilization factor, including predictive algorithms, machine learning algorithms, and the like.

Some embodiments may include maximizing media quality in some instances. For example, in a scenario in which the utilization factor is high and multiple bit rate and bandwidth pairs satisfy the operating constraint, the codec and parameter selector 204 may in some instances select the bit rate and bandwidth pair that has a highest media quality among the subset of acceptable candidate bit rate and bandwidth pairs. Thus, selection of bit rate and bandwidth pairs may at some times choose parameters to increase density, but among a subset of acceptable pairs, use a bit rate and bandwidth pair that has a highest media quality among the subset of acceptable pairs.

At action 406, the network component 304 negotiates use of the first codec and the value for sampling frequency with a first endpoint. For example, the negotiating may be performed according to rules established for SDP. An example is given above with respect to FIG. 3, in which network component 304 negotiates the use of EVS and a particular bit rate and bandwidth pair with endpoint 302. Further in example action 406, the network component 304 also negotiates use of a second codec with a second endpoint, as in the discussion of FIG. 3 above wherein network component 304 and endpoint 306 negotiate use of G.711. Of course, the various codecs are presented as examples, and the scope of embodiments is not limited to any particular codecs. In fact, the principles discussed herein may be applied to various codecs, now known or later developed, which allow for selection of codec parameters during call setup. Additionally, the scope of embodiments is not limited to any to particular types of endpoints, as transcoding may be performed between any wireless or wired endpoints using any appropriate set of codecs.

At action 408, the network component 304 transcodes a media stream of a communication session between the first endpoint and the second endpoint. As noted above, the first endpoint uses a first codec, and the second endpoint uses a second codec. The transcoding may include receiving media encoded using the first codec, decoding the media, re-encoding the media using the second codec, and transmitting the media to the second endpoint. The transcoding may also include the reverse operation, such as receiving media from the second endpoint encoded using the second codec, decoding the media and re-encoding the media using the first codec, and transmitting the encoded media to the first endpoint according to the first codec. Of course, this example also includes using the value for bit rate and sampling frequency that were negotiated at action 406.

While the example of FIG. 4 discusses audio codecs, it is understood that the principles discussed herein may be applied to codecs used for other media, such as video. Thus, the transcoding of action 408 may include transcoding audio, video, or both in any particular communication session.

As can be seen from the discussion of the various figures above, embodiments of the present disclosure may include one more advantages over previous solutions. Some embodiments permit a more efficient use of network component internal resources than the existing approaches. Existing solutions tend to be focused on a worst-case scenario and may have an over-abundance of resources for use during slow times and a scarcity of resources during peak times. In contrast, embodiments of the present disclosure may provide a flexible and more efficient use of resources by negotiating bit rate and bandwidth (or other codec parameters) to balance various performance issues. Thus, during peak times, various embodiments may improve the performance of a computer system (e.g., network component 304) by decreasing media quality in exchange for increasing density during peak times while increasing media quality as appropriate during off-peak times.

Figure 5:
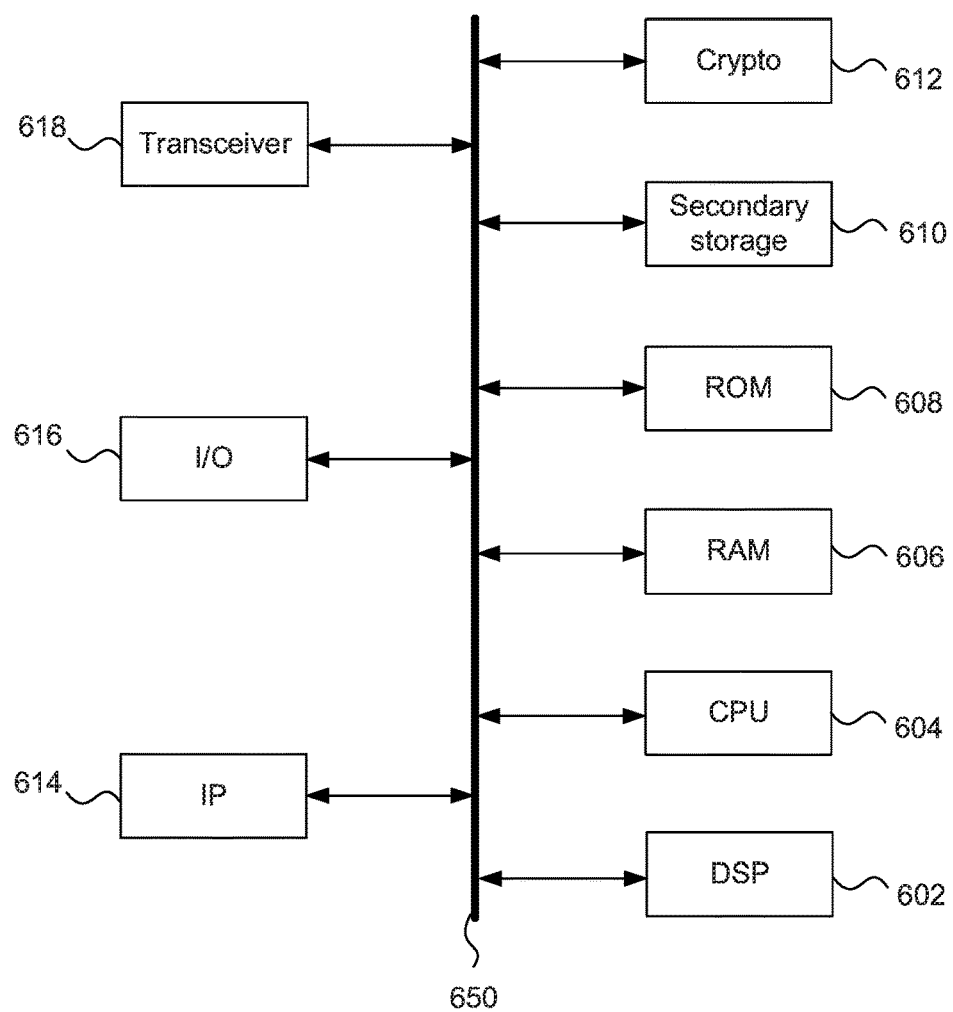
FIG. 5 illustrates an example computer system, according to an embodiment.

FIG. 5 illustrates an example computer system 500 adapted according to an embodiment of the present disclosure. The computer system 500 includes an example system on which embodiments of the present disclosure may be implemented (such as the network components and endpoints). For instance, system 500 represents an embodiment of any of the network components of FIGS. 1-3 (e.g., network components 106, 108, 110, 114, 118 and 304) that may be used to perform the actions described herein with respect to FIGS. 1-4. The computer system 500 includes a digital signal processor (DSP) 602, a central processing unit (CPU) 604, a random access memory (RAM) 606, a read-only memory (ROM) 608, secondary storage 610, encryption and decryption resources 612 (referred to in the figure and herein as "crypto resources"), dedicated IP communications hardware 614, input/output (I/O) devices 616, and transceivers 618, all of which may be communicatively coupled via a bus 650.

The CPU 604 may be implemented using hardware or a combination of hardware and software. Although illustrated as a single CPU, the CPU 604 is not so limited and may comprise multiple processors. The CPU 604 may be implemented as one or more processors, i.e., as one or more chips, cores (e.g., a multi-core processor), field-programmable gate arrays (FPGAs), and/or application specific integrated circuits (ASICs). Likewise, the DSP 602 may be implemented as more than one DSP chip. The DSP 602 may perform transcoding of a media stream or call flow received by transceiver 618. Crypto resources 612 may include a hardware accelerator for performing security features such as encryption or authentication of a media stream or call flow received by transceiver 618.

The secondary storage 610 may comprise one or more disk drives or solid state drives and is used for non-volatile storage of data and as an over-flow data storage device if the RAM 606 is not large enough to hold all working data. The RAM 606 may be static RAM, dynamic RAM, or the like, and the ROM 608 may be programmable ROM (PROM), erasable PROM (EPROM), electrically EPROM (EEPROM), or the like. The secondary storage 610 may be used to store programs that are loaded into the RAM 606 when such programs are selected for execution. The ROM 608 is used to store instructions and optionally data that are read during program execution. The ROM 608 is a non-volatile memory device that typically has a small memory capacity relative to the larger memory capacity of the secondary storage. The RAM 606 is used to store volatile data and optionally to store instructions. Access to both the ROM 608 and the RAM 606 is typically faster than to the secondary storage 610.

The computer system 500 includes transceiver 618. There may be a transceiver 618 for each communication line (e.g., electrical or optical) coupled to the computer system 500. A transceiver 618 may be bidirectional or unidirectional, depending on the embodiment. Each transceiver 618 is adapted to couple computer system 500 to a communication link (e.g., a wired or wireless communication link). In the examples of FIGS. 1-3, transceiver 618 may couple endpoints to network components and network components to each other.

The I/O devices 616 may include a keyboard, a computer mouse, a microphone, and/or a display device for allowing a user to provide input to and receive output from the computer system 500.

It is understood that by programming and/or loading executable instructions onto the computer system 500, at least one of the CPU 604, the RAM 606, and/or the secondary storage 610 are changed, transforming the computer system 500 in part into a particular machine or apparatus having the functionality taught by the present disclosure. The executable instructions may be stored on the RAM 606 or secondary storage 610 and loaded into the CPU 604 for execution. The device functionality described above with respect to FIGS. 1-4 may be implemented as a software application running on the CPU 604 and using the RAM 606, the ROM 608, and/or secondary storage 610. Specifically, for the network component 304, its functions described with respect to FIGS. 1-4 may be implemented as a software application running on the CPU 604.

Logic may be encoded in a non-transitory computer-readable medium, such as RAM 606 and/or secondary storage 610. Such a medium can take many forms, including but not limited to, non-volatile media and volatile media. In various implementations, non-volatile media includes optical or magnetic disks, such as secondary storage 610, and volatile media includes dynamic memory, such as various types of RAM 606. CPU 604 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a network component that facilitates a communication session set-up process among endpoints in a communication network, the method comprising:
   during the communication session set-up process, determining a resource utilization factor of the network component;
   in response to determining the resource utilization factor, selecting a value for sampling frequency for a first codec from a plurality of sampling frequencies associated with the first codec, the sampling frequency being selected based on the resource utilization factor;
   wherein selecting the value for sampling frequency comprises selecting a first sampling frequency and bit rate pair from a plurality of sampling frequency and bit rate pairs, including comparing the resource utilization factor of the network component to a respective and different density value associated with each of the sampling frequency and bit rate pairs; and after the comparing, selecting the first sampling frequency and bit rate pair from the plurality of sampling frequency and bit rate pairs in response to identifying a density value of the first sampling frequency and bit rate pair to satisfy an operating constraint of the network component, each respective density value indicating how many communication sessions a transcoder may handle using a respective sampling frequency and bit rate pair;
   negotiating use of the first codec and the value for sampling frequency with a first endpoint and negotiating use of a second codec with a second endpoint, the negotiating including sending a session initiation protocol (SIP) message to the first endpoint, the SIP message including session description protocol (SDP) information identifying the first codec, the value for sampling frequency, and a value for bit rate and receiving a SIP acknowledgment acknowledging the first codec; and
   transcoding a media stream of a communication session between the first endpoint and the second endpoint according to the first codec and the value for sampling frequency and the second codec;
   wherein the plurality of sampling frequency and bit rate pairs are stored in a lookup table, further wherein each sampling frequency and bit rate pair is associated with a media quality value; and
   wherein selecting the first sampling frequency and bit rate pair comprises parsing the lookup table in accordance with the resource utilization factor; and identifying the first sampling frequency and bit rate pair to satisfy a constraint for resource usage and a constraint for media quality, and wherein the lower the value for density, the more resource usage a given bit rate and bandwidth pair would use.

2. The method of claim 1, wherein the operating constraint of the network component includes a constraint for the resource utilization factor and a constraint for media quality.

3. The method of claim 1, wherein the method is performed by an item selected from a list consisting of:
   a session border controller (SBC);
   a media gateway (MG) and media gateway controller (MGC); and
   a media resource function processor (MRFP) and media resource function controller (MRFC).

4. The method of claim 1, wherein the first codec comprises Enhanced Voice Services (EVS), and wherein the first endpoint comprises a wireless communication device.

5. The method of claim 4, wherein the second endpoint comprises a landline telephone, and wherein the second codec comprises an item selected from a list consisting of: G.711 and G.729.

6. A network component, comprising:
   a transceiver configured to receive a session invite from a first endpoint directed toward a second endpoint, the session invite identifying a first plurality of codecs available at the first endpoint and configured to transmit call set-up information including an identification of a first codec to the first endpoint and an identification of a second codec to the second endpoint;
   a codec parameter selector configured to select a value for sampling frequency from a plurality of sampling frequencies for the first codec, wherein a selected sampling frequency is selected based on a resource utilization factor of the network component and configured to negotiate use of the first codec and the value for sampling frequency with the first endpoint and negotiate use of the second codec with the second endpoint, wherein the sampling frequency is associated with the first codec, wherein negotiation includes sending a session initiation protocol (SIP) message to the first endpoint, the SIP message including session description protocol (SDP) information identifying the first codec, the value for sampling frequency, and a value for bit rate and receiving a SIP acknowledgment acknowledging the first codec;

wherein selecting the value for sampling frequency comprises selecting a first sampling frequency and bit rate pair from a plurality of sampling frequency and bit rate pairs, including comparing the resource utilization factor of the network component to a respective and different density value associated with each of the sampling frequency and bit rate pairs; and after the comparing, selecting the first sampling frequency and bit rate pair from the plurality of sampling frequency and bit rate pairs in response to identifying a density value of the first sampling frequency and bit rate pair to satisfy an operating constraint of the network component, each respective density value indicating how many communication sessions the network component may handle using a respective sampling frequency and bit rate pair;

wherein the plurality of sampling frequency and bit rate pairs are stored in a lookup table, further wherein each sampling frequency and bit rate pair is associated with a media quality value; and wherein selecting the first sampling frequency and bit rate pair comprises parsing the lookup table in accordance with the resource utilization factor; and identifying the first sampling frequency and bit rate pair to satisfy a constraint for resource usage and a constraint for media quality, and wherein the lower the value for density, the more resource usage a given bit rate and bandwidth pair would use;

a transcoder configured to transcode a media stream of a communication session between the first endpoint and the second endpoint according to the first codec and the value for sampling frequency and the second codec; and one or more processors configured to execute the codec parameter selector and the transcoder.

7. The network component of claim 6, wherein the network component comprises a session border controller (SBC).

8. The network component of claim 6, wherein the network component comprises a media resource function processor (MRFP) and a media resource function controller (MRFC).

9. The network component of claim 6, wherein:
the resource utilization factor comprises an indication of utilization of at least one item selected from a list consisting of: a digital signal processor (DSP) resource of the network component and a memory resource of the network component.

10. A computer program product comprising machine-readable instructions on a non-transitory storage medium of a network component for facilitating a communication session between a first endpoint and a second endpoint in a communication network, the computer program product comprising:

code to determine a resource utilization factor of a transcoding network component;

code to select a value for sampling frequency based on the resource utilization factor, including selecting a first sampling frequency and bit rate pair for a first codec from a plurality of sampling frequency and bit rate pairs, including comparing the resource utilization factor of the transcoding network component to a respective and different density value associated with each of the sampling frequency and bit rate pairs; and after the comparing, selecting the first sampling frequency and bit rate pair from the plurality of sampling frequency and bit rate pairs in response to identifying a density value of the first sampling frequency and bit rate pair to satisfy an operating constraint of the transcoding network component, each respective density value indicating how many communication sessions the transcoding network component may handle using a respective sampling frequency and bit rate pair;

code to negotiate use of the first codec and the value for sampling frequency with the first endpoint and negotiate use of a second codec with the second endpoint, wherein negotiation includes sending a session initiation protocol (SIP) message to the first endpoint, the SIP message including session description protocol (SDP) information identifying the first codec, the value for sampling frequency, and a value for bit rate and receiving a SIP acknowledgment acknowledging the first codec; and code to transcode a media stream of a communication session between the first endpoint and the second endpoint according to the first codec and the value for sampling frequency and the second codec;

wherein the plurality of sampling frequency and bit rate pairs are stored in a lookup table, further wherein each sampling frequency and bit rate pair is associated with a media quality value; and wherein selecting the first sampling frequency and bit rate pair comprises parsing the lookup table in accordance with the resource utilization factor; and identifying the first sampling frequency and bit rate pair to satisfy a constraint for resource usage and a constraint for media quality, and wherein the lower the value for density, the more resource usage a given bit rate and bandwidth pair would use.

* * * * *